US012692194B2

(12) United States Patent
Pardos et al.

(10) Patent No.: US 12,692,194 B2
(45) Date of Patent: Jul. 28, 2026

(54) METHOD FOR THE REFURBISHMENT OF POROUS CONSTRUCTION MATERIALS

(71) Applicant: SIKA TECHNOLOGY AG, Baar (CH)

(72) Inventors: Yolanda Pardos, Madrid (ES); Javier Quesada, Madrid (ES)

(73) Assignee: SIKA TECHNOLOGY AG, Baar (CH)

( * ) Notice: Subject to any disclaimer, the term of this patent is extended or adjusted under 35 U.S.C. 154(b) by 547 days.

(21) Appl. No.: 18/026,689

(22) PCT Filed: Nov. 12, 2021

(86) PCT No.: PCT/EP2021/081576
§ 371 (c)(1),
(2) Date: Mar. 16, 2023

(87) PCT Pub. No.: WO2022/106320
PCT Pub. Date: May 27, 2022

(65) Prior Publication Data
US 2023/0348329 A1 Nov. 2, 2023

(30) Foreign Application Priority Data
Nov. 17, 2020 (EP) ..................................... 20382993

(51) Int. Cl.
| | |
|---|---|
| *C04B 28/04* | (2006.01) |
| *C04B 7/02* | (2006.01) |
| *C04B 14/10* | (2006.01) |
| *C04B 40/06* | (2006.01) |
| *C04B 111/00* | (2006.01) |
| *C04B 111/40* | (2006.01) |
| *C04B 111/72* | (2006.01) |

(52) U.S. Cl.
CPC ................ *C04B 28/04* (2013.01); *C04B 7/02* (2013.01); *C04B 14/106* (2013.01); *C04B 40/0608* (2013.01); *C04B 2111/00155* (2013.01); *C04B 2111/00482* (2013.01); *C04B 2111/40* (2013.01); *C04B 2111/72* (2013.01)

(58) Field of Classification Search
CPC ......... C04B 28/04; C04B 14/106; C04B 7/02; C04B 2111/72; C04B 40/0608; C04B 2111/00155; C04B 2111/00577; Y02W 30/91; C09K 8/46; C09K 8/428; Y02P 40/10
See application file for complete search history.

(56) References Cited

U.S. PATENT DOCUMENTS

| | | | |
|---|---|---|---|
| 6,653,373 B2 | 11/2003 | Garrett et al. |
| 2015/0113907 A1 | 4/2015 | Dong et al. |

FOREIGN PATENT DOCUMENTS

| | | | | | |
|---|---|---|---|---|---|
| JP | 2013014453 A | * | 1/2013 | ............. | C04B 28/02 |
| RU | 2689959 C1 | * | 5/2019 | ............. | C04B 28/06 |
| WO | WO-9833749 A1 | * | 8/1998 | ............. | F16L 58/06 |
| WO | 2007/039168 A1 | | 4/2007 | | |
| WO | 2011/057898 A1 | | 5/2011 | | |
| WO | 2014/085538 A1 | | 6/2014 | | |
| WO | 2015/193419 A1 | | 12/2015 | | |

OTHER PUBLICATIONS

Machine translation of JP 2013014453 A (Year: 2013).*
U.S. Department of Transportation, Federal Highway Administration (DOT FHWA) (Year: 2015).*
Machine translation of RU 2689959 C1, with Google-translated Table 2 (Year: 2019).*
Sika, "Refurbishment. The Repair and Protection of Reinforced Concrete with Sika" (Year: 2018).*
Bucher et al., "Carbonation of Blended Binders Containing Metakaolin," Calcined Clays for Sustainable Concrete, K. Scrivener and A. Favier (eds.), Jan. 2015, pp. 27-33.
May 23, 2022 International Search Report issued in International Patent Application No. PCT/EP/2021/081576.
May 23, 2022 Written Opinion issued in International Patent Application No. PCT/EP/2021/081576.
Teoreanu et al., "Comparative Interpretation of the Effect of Surfactants on Grinding Portland Cement with High Proportions of Granulated Blast Furnace Slag," U.P.B. Sci. Bull., 2009, Series B, vol. 71, Iss. 71, pp. 19-28.

* cited by examiner

*Primary Examiner* — Amber R Orlando
*Assistant Examiner* — Ryan Patrick Loughran
(74) *Attorney, Agent, or Firm* — Oliff PLC

(57) ABSTRACT

A method for the refurbishment of porous construction materials and a composition including Portland cement, calcined clay, and optionally aggregate to be used in the method for the refurbishment of porous construction materials. The method includes the steps of mixing water and a composition C, the composition C including, a) 100 mass parts of Portland Cement, b) 1-18 mass parts, preferably 1-10 mass parts, more preferably 1-7.5 mass parts, still more preferably 1-6 mass parts, especially 1-5 mass parts of calcined clay, c) optionally 10-250 mass parts of aggregates, applying the mixture thus obtained to a porous construction material, and optionally hardening the applied mixture.

12 Claims, No Drawings

METHOD FOR THE REFURBISHMENT OF POROUS CONSTRUCTION MATERIALS

TECHNICAL FIELD

The invention relates to a method for the refurbishment of porous construction materials. The invention also relates to a composition comprising Portland cement, calcined clay, and optionally aggregate to be used in a method for the refurbishment of porous construction materials.

BACKGROUND

Pozzolanes are materials which have little or no cementitious or hydraulic activity by themselves but will react with calcium hydroxide in the presence of water to form compounds that possess cementitious properties. Calcined clays, and especially metakaolin which is the dehydroxylated form of the clay mineral kaolinite, are examples of pozzolanes.

Pozzolanes have been used in cementitious formulations for many years to replace at least some of the main cement binder (typically Portland cement) or in addition to the main binder. This may reduce the environmental impact of the binder because fewer $CO_2$ is emitted during production of e.g. calcined clays when compared to Portland cement. The use of pozzolanes, and especially of calcined clays, is also known to improve the performance characteristics and especially the durability of cementitious materials.

However, the effect of adding a pozzolane as part of the hydraulic binder system has also been reported to have a negative impact on the carbonation resistance of hardened cementitious materials (Bucher R., Cyr M., Escadeillas G. (2015) *Carbonation of Blended Binders Containing Metakaolin.* In: Scrivener K., Favier A. (eds) *Calcined Clays for Sustainable Concrete. RILEM Book series*, vol 10. Springer, Dordrecht). Especially when higher amounts of metakaolin are being used the carbonation resistance may become unacceptably low.

When designing and formulating cementitious compositions, especially mortars, to be used in the refurbishment of porous construction materials, e.g. as part of buildings, it is, however, desirable to achieve a good resistance to various chemicals, including resistance to water ingress as well as resistance to carbonation. It is also highly desirable to achieve a high flexural strength of such cementitious compositions to avoid cracking.

WO 1998/33749 teaches compositions consisting of Ordinary Portland Cement (100 mass parts), metakaolin (11-42 mass parts), and sand for the corrosion protection of surfaces. These compositions are described to have low leaching.

WO 2007/039168 teaches a cement composition with resistance to carbon dioxide. The composition may comprise cement (100 mass parts), metakaolin (48 mass parts), and hollow microspheres (40 mass parts). The composition uses a high amount of metakaolin and relies on the hollow microspheres to trap the carbonation products.

WO 2015/193419 teaches hydraulic compositions comprising 100 mass parts of cement with a BET surface of 1.2-5 $m^2/g$, 5-50 mass parts of metakaolin with a particle size D50 equal or below 6 μm, and 90-230 mass parts of sand with a particle size D50 equal or below 50 μm and D90 equal or below 3 mm. These compositions are said to be useful in the refurbishment of concrete structures.

The compositions and methods of prior art are not in every aspect suitable for the purpose of the refurbishment of porous construction materials. Especially, compositions of the prior art often do not have a high resistance to water ingress, a high resistance to carbonation, and a high flexural strength. Furthermore, compositions of the prior art frequently use raw materials that are more expensive thus making commercial implementation difficult. There exists thus a continued need for compositions and methods for the refurbishment of porous construction materials.

SUMMARY OF THE INVENTION

It is an objective of the present invention to provide a method for the refurbishment of porous construction materials. Such method should especially provide refurbished porous construction materials with a high resistance against ingress, especially ingress of water, and low depth of carbonation. Advantageously, in a method for the refurbishment of porous construction materials with high compressive strength and high flexural strength are used. A high compressive strength and high flexural strength may lead to increased durability.

Surprisingly it was found that the objectives of the present invention can be solved by a method as claimed in claim 1.

It is especially possible to use a composition C comprising, a) 100 mass parts of Portland Cement,
  b) 1-18 mass parts, preferably 1-10 mass parts, more preferably 1-7.5 mass parts, still more preferably 1-6 mass parts, especially 1-5 mass parts of calcined clay,
  c) optionally 10-250 mass parts of aggregates, in a method for the refurbishment of porous construction materials.

It is an advantage of the present invention that the composition C will harden to a material that has an increased compressive strength and an increased flexural strength and at the same time offers a good resistance to ingress, especially water ingress (measurable as a low coefficient of capillary absorption) as well as to carbonation.

Further aspects of the present invention are subject of the independent claims. Preferred embodiments are subject of the dependent claims.

WAYS OF CARRYING OUT THE INVENTION

In a first aspect, the present invention relates to a method for the refurbishment of porous construction materials, said method comprising the steps of mixing water and a composition C, said composition C comprising,
  a) 100 mass parts of Portland Cement,
  b) 1-18 mass parts, preferably 1-10 mass parts, more preferably 1-7.5 mass parts, still more preferably 1-6 mass parts, especially 1-5 mass parts of calcined clay
  c) optionally 10-250 mass parts of aggregates,
  applying the mixture thus obtained to a porous construction material, and
  optionally hardening the applied mixture.

Porous construction materials in the sense of the present invention are construction materials with a porosity large enough to allow the uptake of water and the transport of water by capillary suction. Porous construction materials are preferably selected from the list consisting of cementitious materials, especially concrete or mortar, bricks, especially clay bricks, poroton stone, sand limestone, aerated concrete stone, ceramic tiles, calcium sulfate based materials, and wood. It is most preferred, within the context of the present invention, that the method for the refurbishment of porous construction materials is a method for the refurbishment of cementitious materials, especially concrete or mortar. A cementitious material is a material which comprises cement as the main binder component. In an especially preferred embodiment, the cementitious material is hardened concrete or mortar.

Portland Cement within the present context is of the type CEM I, CEM II, CEM III, CEM IV or CEM V according to standard EN 197-1. Portland cements which are described in alternative standards, for example ASTM standards or Chinese standards are equally suitable. According to preferred embodiments, Portland cement is Ordinary Portland Cement (OPC) of type CEM I. According to especially preferred embodiments, the Portland cement is a white OPC. According to embodiments, the OPC clinker content in a Portland cement of the present invention is at least 20 w %, preferably at least 35 wt.-%, more preferably at least 65 wt.-%, especially at least 95 wt.-%, each based on the total dry weight of the cement. According to embodiments, the Portland cement clinker has an aluminium content, expressed as $Al_2O_3$, of less than 10 wt.-%, preferably less than 8 wt.-%, more preferably less than 6 wt.-%, in each case relative to the total dry weight of the clinker. According to especially preferred embodiments, the Blaine surface of the Portland cement as measured according to standard EN 196-6:2010 is between 1,500-10,000 cm2/g, preferably 2,000-6,000 cm2/g, more preferably 2,000-5,500 cm2/g, especially 2,500-5,000 cm2/g. The BET surface of the Portland cement of the present invention preferably is <1.2 $m^2/g$, more preferably <1.0 $m^2/g$. The BET surface can be measured according to standard ISO 9277:2010. Preferably the sulphate content of Portland cements of the present invention is optimized to an $SO_3$ content of not more than 4.0 wt.-%, relative to the total dry weight of the cement.

Throughout the present invention the term "clay" refers to a solid material composed to at least 30 wt.-%, preferably to at least 35 wt.-%, especially to at least 75 wt.-%, each relative to its dry weight, of clay minerals. Such clay minerals preferably belong to the kaolin group (such as kaolinite, dickite, nacrite or halloysite), the smectite group (such as montmorillonite, nontronite or saponite), the vermiculite group, serpentine, palygorskite, sepiolite, chlorite, talc, pyrophyllite, micas (such as biotite muscovite, illite, glauconite, celadonite, and phengite) or mixtures thereof. Clay minerals belonging to the kaolin group, especially kaolinite, and micas, especially muscovite and illite, as well as mixtures thereof are especially preferred.

A "calcined clay" is a clay material that has been put to a heat treatment, preferably at a temperature between 500-900° C., or in a flash calcination process at temperatures between 800-1100° C. A suitable flash calcination process is for example described in WO 2014/085538. A calcined clay is an anhydrous material. According to embodiments, calcined clays are produced by heat treatment separately from other constituents of the binder composition and especially separately from the Portland cement and/or other pozzolanic and/or latent hydraulic materials present in a composition C of the present invention. It is preferred within the present context that during the calcination of clay the clay material is dehydroxylated to an amorphous material while the formation of crystalline high temperature aluminosilicate phases such as mullite is prevented. Calcined clays, and especially calcined kaolinite, generally are amorphous, have a significantly higher specific surface as compared to the original clay, and have a pozzolanic activity. According to especially preferred embodiments of the present invention, the calcined clay is metakaolin. Metakaolin is a material resulting from the calcination of kaolinite or minerals that are rich in kaolinite, e.g. have a content of kaolinite of at least 30 wt.-%, preferably to at least 35 wt.-%, relative to its dry weight. Calcination temperatures for the manufacturing of metakaolin typically are in the range of 500-900° C.

Especially preferred calcined clays within the present context have an average particle size D50 of not more than 10 μm, preferably of not more than 6 μm, especially of 1-5 μm.

The particle size can be determined by laser diffraction as described in ISO 13320:2009. In particular, a Mastersizer 2000 instrument with a Hydro 2000G dispersion unit and the Mastersizer 2000 software from Malvern Instruments GmbH (Germany) is used. Isopropanol, for example, is suitable as the measuring medium. Preferably, a particle size of non-spherical or irregular particles is represented by the equivalent spherical diameter of a sphere of equivalent volume. Throughout this invention, whenever a range of particle sizes is given, these particle sizes are measured by laser diffraction. The lower values of the ranges given for the particle size herein represent D10 values whereas the upper values of the ranges given for the particle size herein represent D90 values of the respective particle size distribution. In other words, the lower values of such ranges correspond to the particle size where only 10% of all particles have a lower particle size, whereas the upper values of such ranges correspond to the particle size where only 10% of all particles have a larger particle size. The average particle size corresponds in particular to the D50 value (50% of the particles are smaller than the given value, 50% are correspondingly bigger).

According to embodiments, the composition C of the present invention comprises
   a) 100 mass parts of Portland Cement with a Blaine surface of 1,500-10,000 cm2/g, preferably 2,000-6,000 cm2/g, more preferably 2,000-5,500 cm2/g, especially 2,500 5-5,000 cm2/g,
   b) 1-18 mass parts, preferably 1-10 mass parts, more preferably 1-7.5 mass parts, still more preferably 1-6 mass parts, especially 1-5 mass parts of metakaolin with an average particle size D50 of not more than 10 μm, preferably of not more than 6 μm, especially of 1-5 μm, and
   c) optionally 10-250 mass parts of aggregate.

According to further embodiments, the composition C of the present invention comprises
   a) 100 mass parts of white Portland Cement with a Blaine surface of 1,500-10,000 cm2/g, preferably 2,000-6,000 cm2/g, more preferably 2,000-5,500 cm2/g, especially 2,500-5,000 cm2/g,
   b) 1-18 mass parts, preferably 1-10 mass parts, more preferably 1-7.5 mass parts, still more preferably 1-6 mass parts, especially 1-5 mass parts of metakaolin with an average particle size D50 of not more than 10 μm, preferably of not more than 6 μm, especially of 1-5 μm, and
   c) optionally 10-250 mass parts of aggregate.

According to still further embodiments, the composition C of the present invention comprises
   a) 100 mass parts of Ordinary Portland Cement with a Blaine surface of 1,500-10,000 cm2/g, preferably 2,000-6,000 cm2/g, more preferably 2,000-5,500 cm2/g, especially 2,500-5,000 cm2/g,
   b) 1-18 mass parts, preferably 1-10 mass parts, more preferably 1-7.5 mass parts, still more preferably 1-6 mass parts, especially 1-5 mass parts of metakaolin with an average particle size D50 of not more than 10 μm, preferably of not more than 6 μm, especially of 1-5 μm, and c) optionally 10-250 mass parts of aggregate.

According to still further embodiments, the composition C of the present invention comprises a) 100 mass parts of white Ordinary Portland Cement with a Blaine surface of 1,500-10,000 cm2/g, preferably 2,000-6,000 cm2/g, more preferably 2,000-5,500 cm2/g, especially 2,500-5,000 cm2/g, b) 1-18 mass parts, preferably 1-10 mass parts, more preferably 1-7.5 mass parts, still more preferably 1-6 mass parts, especially 1-5 mass parts of metakaolin with an average particle size D50 of not more than 10 μm, preferably of not more than 6 μm, especially of 1-5 μm, and c) optionally 10-250 mass parts of aggregate.

It can be preferred that the total content of calcined clay, especially of metakaolin in a composition C of the present invention is in the range of 0.2-6 wt.-%, preferably 0.5-5 wt.-%, in each case relative to the total dry weight of the composition C.

Aggregates, within the present context, can be any material that is non-reactive in the hydration reaction of hydraulic binders. Aggregates can be any aggregate typically used for cementitious compositions. Typical aggregates are for example rock, crushed stone, gravel, slag, sand, especially quartz sand, river sand and/or manufactured sand, recycled concrete, glass, expanded glass, hollow glass beads, glass ceramics, volcanic rock, pumice, perlite, vermiculite, quarry wastes, raw, fired or fused earth or clay, porcelain, electrofused or sintered abrasives, firing support, silica xerogels, and/or fine aggregates such as ground limestone, ground dolomite, and/or ground aluminum oxide. Aggregates useful for the present invention can have any shape and size typically encountered for such aggregates. An especially preferred aggregate is sand. Sand is a naturally occurring granular material composed of finely divided rock or mineral particles. It is available in various forms and sizes. Examples of suitable sands are quartz sand, limestone sand, river sand or crushed aggregates. Suitable sands are for example described in standards ASTM C778 or EN 196-1. According to embodiments, at least part of the sand used for a composition C of the present invention is quartz sand, river sand, manufactured sand, for example from granite or limestone, or mixtures thereof. According to a preferred embodiment, river sand is used for a composition C of the present invention, since it is chemically inert, strong, available in various sizes and the workability of the composition can be set advantageously. Commonly, sand is supplied in different fractions of particles passing through a sieve with clear openings. According to embodiments, sand with 99% particles having a size of 3 mm or lower, preferably of 2 mm or lower, more preferably of 1 mm or lower, still more preferably of 0.8 mm or lower, especially of 0.6 mm or lower, in each case as measured according to ASTM C136/136M, is used for a composition C of the present invention. Larger particles may lead to improper mixing.

According to further embodiments, aggregates can also be one or more of the following (i)-(v):

(i) bio-sourced materials, preferably of plant origin, more preferably bio-sourced materials of plant origin essentially composed of cellulose and/or lignin, especially bio-sourced materials selected from the group comprising or consisting of hemp, flax, cereal straw, oats, rice, rape, maize, sorghum, flax, miscanthus, rice husk, sugar cane, sunflower, kenaf, coconut, olive stones, bamboo, wood, or mixtures thereof. According to embodiments, bio-sourced materials of plant origin have a defined form which is preferably selected from fibres, fibrils, dust, powders, shavings, pith, in particular pith of sunflower, maize, rape, and mixtures thereof.

(ii) synthetic non-mineral materials, preferably selected from the group comprising or consisting of thermoplastic, thermosetting plastics, elastomers, rubbers, textiles fibers, plastic materials reinforced with glass or carbon fibres. Synthetic non-mineral materials can be filled or unfilled.

(iii) aggregates of inorganic nature from the deconstruction of civil engineering or building structures, preferably selected from the group comprising or consisting of waste concrete, mortar, bricks, natural stone, asphalt, tiles, tiling, aerated concrete, clinker, scrap metal.

(iv) aggregates of organic nature from the recycling of industrial products, in particular composite materials which are difficult to recycle, especially recycled insulating materials. Especially preferred examples are polystyrenes, polyurethanes, phenolic resins, wood insulating materials, and mixtures thereof.

(v) non-hazardous granular materials usually destined for landfill such as used foundry sands, catalyst supports, Bayer process de-soding treatment supports, clinker aggregates, fillers from the treatment of excavation sludge, sewage sludge, slurry, paper waste, paper incineration ashes, household waste incineration ashes.

Most preferably, aggregates are in particulate form.

According to embodiments, a composition C of the present invention comprises from 35-85 wt.-%, preferably 50-80 wt.-%, especially 60-75 wt.-%, each based on the total dry weight of the composition C, of aggregates, especially of sand.

A composition C of the present invention may advantageously additionally comprise further materials common in the mortar and/or concrete industry such as for example fillers, plasticizers and/or superplasticizers, air entrainers, defoamers, stabilizers, rheology modifiers, especially thickeners, water reducers, redispersible polymer powders, accelerators, retarders, water resisting agents, strength enhancing additives, fibers, dedusting agents, blowing agents, pigments, corrosion inhibitors, biocides, chromium(VI) reducers. It can be advantageous to combine two or more of the mentioned further materials in one hydraulically setting composition.

According to embodiments, the composition C additionally comprises a plasticizer, preferably a polycarboxylate ether. Polycarboxylate ethers are especially suitable if a composition C is applied by a continuous spray application as defined below. This ensures that mixing with water and pumping through hoses is possible without problems. A composition of the present invention may also comprise further pozzolanic material, other than calcined clays, and/or latent hydraulic materials. Preferably further pozzolanic materials and/or latent hydraulic materials are selected from the list consisting of silica fume, fly ash, slag, rice husk ash, burnt shale, pumice, trass, volcanic ashes, zeolites, and diatomaceous earth.

According to particularly preferred embodiments, a composition C is a dry composition, especially a dry composition in powder form. This means that the composition C has a water content of <5 wt.-%, preferably <2 wt.-%, more preferably <1 wt.-%, still more preferably <0.5 wt.-%, especially <0.1 wt.-%, each based on the total weight of the composition C.

According to preferred embodiments, a composition C is a one-component composition. This means that all materials constituting said composition C are comprised in a mixed state within a single packaging. A one-component composition C preferably is a dry powder. Such dry, powdered, one-component compositions have the advantage that they can be stored and transported for prolonged times. They can also easily be handled and mixed with water at the site of application and less errors may occur during metering at the site of application.

It is, however, also possible to provide a composition C as a two component or even a multicomponent composition. In such a case it is especially preferred that the Portland cement, the calcined clay, and optionally additives are present in a first compartment, and the aggregate and optionally additives are present in a second, spatially separated compartment. It is especially possible that additives are present in a third, spatially separate compartment. A two component or even a multicomponent composition has the advantage that the properties can be adjusted according to the requirements of a specific jobsite.

Water within the present context can be any water available such as distilled water, purified water, tap water, mineral water, spring water, well water, wastewater or salt water. However, the use of wastewater is possible only in cases where the composition of such wastewater is known and where none of the impurities comprised may impart the functionality of any other component of the composition of the present invention. The use of salt water is limited to cases where its high content of chlorides does not constitute a risk of corrosion of steel reinforcement.

Water is preferably mixed with a composition C in a weight ratio of water to powder in the range of 1:1 to 1:11, preferably of 1:2 to 1:8, more preferably of 1:2 to 1:5. The term "powder" relates to all dry, powdery components of the composition C. The said weight ratio is thus equal to the weight ratio of water to the total dry weight of the composition C. The weight ratio of water to powder can be adjusted to control the rheology of the resulting mixture. A higher amount of water will lead to a more flowable mixture and a lower amount of water to a more pasty mixture. The rheology may be adjusted by the amount of water in a way to yield a mixture with a rheology ranging from self-levelling to very thick. It is especially preferred to add water in an amount so that non-sag properties result which significantly facilitates the application, especially on vertical substrates or substrates with an inclination.

Methods and devices for mixing of water with a composition C are not particular limited and are known to the person skilled in the art. It is for example possible to mix water with a composition C by means of a hand held agitator, Hobart mixer, portable concrete mixer, mixing truck, mixing bucket, paddle mixer, jet mixer, screw mixer, auger mixer, horizontal single shaft mixer, twin shaft paddle mixer, vertical shaft mixer, ribbon blender, orbiting mixer, change-can mixer, tumbling vessel, vertical agitated chamber or air agitated operations. Mixing can be continuously, semi-continuously or batch-wise. Continuous mixing offers the advantage of a high material throughput.

The method of the present invention comprises at least one step of applying the mixture of water and a composition C as defined above to a porous construction material as defined above.

It is possible to apply said mixture of water and a composition C by any means known to the person skilled in the art. According to one embodiment, in a method of the present invention, the mixture of water and a composition C is applied by trowel, brush or roller. According to another embodiment, in a method of the present invention, the mixture of water and a composition C is applied in a spray application, preferably a continuous spray application.

Spray applications have the advantage that the application can be done very quickly and in a continuous manner. Suitable equipment for such spray applications is known to the person skilled in the art. According to an especially preferred embodiment, a method of the present invention comprises a step of applying a mixture of water and a composition C in a continuous manner. Such method is characterized in that water and a composition C are mixed continuously and are supplied to a dispenser head in a continuous manner. This allows for a continuous application.

A method of the present invention may also comprise a second or third step of applying the mixture of water and a composition C to a porous construction material as defined above. It is, in other words, possible to apply the mixture of water and a composition C in a method of the present invention in one layer, in two layers, or in three layers.

According to embodiments, the mixture of water and a composition C is applied in a method of the present invention to a porous construction material to yield a total layer thickness of 0.5-50 mm, preferably 1-40 mm, more preferably 2-25 mm, especially 3-10 mm. This layer thickness refers to the total layer thickness of the mixture of water and a composition C as described above and applied to a porous construction material before drying and hardening. According to preferred embodiments, a method of the present invention may thus be characterized in that the mixture of water and a composition C is applied in a one-step procedure as one layer or in a multiple-step procedure as two or three layers to yield a total layer thickness of 0.5-50 mm, preferably 1-40 mm, more preferably 2-25 mm, especially 3-10 mm. An application in two or three layers may help to avoid imperfections such as air bubbles or inhomogeneous layer thickness.

Hardening of a composition C occurs by the reaction of Portland Cement and calcined clay with water. Hardening thus starts when the composition C is mixed with water. During production, storage, and transport, a composition C thus needs to be protected from moisture.

Hardening proceeds with time and physical properties, e.g. flexural strength, resistance to chemicals, carbonation resistance, resistance to water ingress, etc. develop thereby. A composition C will harden at various temperatures. It is, however, preferred to harden a composition C at temperatures between +4° C. and +50° C., preferably between +5° C. and +35° C. A method of the present invention is thus preferably carried out at temperatures between +4° C. and +50° C., preferably between +5° C. and +35° C.

It is possible to include further steps into a method of the present invention. Such further steps typically are directed to further increase the performance of a porous construction material treated in a method for its refurbishment as described above. Such steps may be included in a method of the present invention before or after the application of the mixture of water and a composition C. According to embodiments, a method of the present invention includes one or more further steps selected from removing part of the porous construction material, cleaning the surface of the porous construction material, and/or priming the surface. Priming is especially preferred in cases where the construction material has a very high porosity. According to further embodiments, a method of the present invention includes one or more further steps selected from the application of further layers on top of the mixture of water and a composition C. Such further layers being selected e.g. from decorative paint, decorative coating or further cementitious layers.

The method of the present invention preferably is a method according to one of the principles and methods as defined in European family of standards EN 1504. According to embodiments, a method of the present invention is thus a method for the protection against ingress according to method 1.3 of standard EN 1504-9, a method for the moisture control according to method 2.3 of standard EN 1504-9, a method for concrete restoration according to method 3.1 or 3.3 of standard EN 1504-9, a method for structural strengthening according to method 4.4 of standard EN 1504-9, a method for increasing the physical resistance according to methods 5.1 or 5.3 of standard EN 1504-9, a method of increasing the resistance to chemicals according to method 6.3 of standard EN 1504-9, a method of preserving or restoring passivity according to methods 7.1 or 7.2 of standard EN 1504-9, or a method of increasing the resistivity according to method 8.3 of standard EN 1504-9.

Preferably, the method of the present invention is a method for the moisture control according to method 2.3 of standard EN 1504-9, a method for concrete restoration according to method 3.1 or 3.3 of standard EN 1504-9, a method for structural strengthening according to method 4.4 of standard EN 1504-9, a method for increasing the physical resistance according to methods 5.1 or 5.3 of standard EN 1504-9, or a method of increasing the resistance to chemicals according to method 6.3 of standard EN 1504-9. Preferably, the method of the present invention is not a method for the corrosion protection of surfaces.

Throughout this document any reference to standard EN 1504-9 is a reference to this standard as published in 2008. That is any reference to standard EN 1504-9 is a reference to standard EN 1504-9:2008.

In another aspect, the present invention relates to a dry composition C for use in a method as described above, said composition comprising a) 100 mass parts of at least one binder selected from Portland cement, b) 1-18 mass parts, preferably 1-10 mass parts, more preferably 1-7.5 mass parts, still more preferably 1-6 mass parts, especially 1-5 mass parts of calcined clay, c) optionally 10-250 mass parts of aggregates.

The details as related to the dry composition C are as described above. The present invention also relates to a wet composition obtained by mixing a dry composition C with water in a water to powder ratio of 1:1 to 1:11, preferably of 1:2 to 1:8, more preferably of 1:2 to 1:5.

In yet another aspect, the present invention also relates to a porous construction material obtained by a method as described above.

The porous construction material, for example as part of a building, treated by a method as described above comprises at least one layer of a hardened mixture of water and a composition C. A porous construction material treated by a method as described above is characterized by a reduced ingress of water, an increased resistance against carbonation, an increased resistance to chemicals, an increased resistivity.

A porous construction material, for example as part of a building, treated by a method as described above and comprising at least one layer of a hardened mixture of water and a composition C has a reduced permeability for gases, especially for $CO_2$. The permeability to $CO_2$ can be measured according to EN 1062-6:2003.

A porous construction material, for example as part of a building, treated by a method as described above and comprising at least one layer of a hardened mixture of water and a composition C has an increased resistivity. The resistivity can for example be measured according to standard ASTM C1876.

A porous construction material treated by a method as described above can be part of a building. It is preferred if such treated construction materials are part of an outside structure which is subject to contact with water, for example caused by dew, rain, spray, and/or tides. It is equally preferred if such treated porous construction materials are part of a wet room, for example a bathroom, a kitchen, or a swimming pool.

The porous construction material preferably is part of a building. The porous construction material can especially be part of basement walls, floor structures, drainages, pipes, silos, stairs, bathrooms, kitchens, swimming pools, balconies, terraces, ponds or basins, harbor structures or works of civil engineering.

A method of the present invention is equally suitable to be integrated in the restoration of new or historic buildings.

The following examples will further illustrate the present invention. They are not intended to limit the scope of the invention in any way.

EXAMPLES

The following table 1 gives an overview of the raw materials used

TABLE 1

| Raw materials used | |
| --- | --- |
| OPC 1 | CEM I 52.5 R (grey) |
| OPC 2 | CEM I 52.5 R (white) |
| Sand | Quartz sand (0.1-2 mm) |
| MK 1 | Metakaolin from high purity kaolin clay (0.1% of particles >44 µm) |
| MK 2 | Metakaolin from high purity kaolin clay (D90: 15 µm, D50: 3.2 µm) |
| MK 3 | Metakaolin from kaolinitic clay (D50 = 2 µm; BET surface 19 m²/g) |
| Plasticizer | Sodium salt of a sulfamic acid modified melamine-formaldehyde polymer |
| Defoamer | Axilat DF770DD |

Test Methods

Compressive strength was measured according to standard EN 12190 on 4×4×16 cm prisms. The compressive strength was tested after curing of the test specimen for the time indicated in the below table at 23° C. and 50% r.h.

Flexural strength was measured according to standard EN 196-1 on prisms 40×40×160 mm after curing of the test specimen for the time indicated in the below table at 23° C. and 50% r.h.

Capillary absorption was tested according to standard EN 13057.

Carbonation depth was measured according to standard UNE EN 14630.

Examples 1-1 to 1-12

Examples 1-1 to 1-12 were prepared by mixing all components except water on a Hobart mixer for 3 minutes at 1000 rpm. The amounts to be mixed for the individual examples are given in the below table 2. Visually homogeneous powders were obtained in every case.

The respective powder was then mixed with water in the amount indicated in the below table 2 on a Hobart mixer for 30 seconds at 1000 rpm.

Examples 1-1, 1-5, and 1-9 are comparative examples and are not according to the present invention. Examples 1-2 to 1-4, 1-6 to 1-8, and 1-10 to 1-12 are according to the present invention.

The resulting mixtures were tested as indicated above. The following table 2 shows the results.

TABLE 2

| Composition of examples 1-1-1-12 and measured results (all dosages in g) | | | | | | | | |
|---|---|---|---|---|---|---|---|---|
| Example | 1-1 | 1-2 | 1-3 | 1-4 | 1-5 | 1-6 | 1-7 | 1-8 |
| OPC 1 | 35 | 33 | 31.5 | 29.75 | | | | |
| OPC 2 | | | | | 35 | 33 | 31.5 | 29.75 |
| Sand | 65 | 65 | 65 | 65 | 65 | 65 | 65 | 65 |
| MK 1 | | 2 | 3.5 | 5.25 | | 2 | 3.5 | 5.25 |
| Plasticizer | | 0.1 | 0.2 | 0.35 | | 0.1 | 0.2 | 0.35 |
| Defoamer | 0.01 | 0.01 | 0.01 | 0.01 | 0.01 | 0.01 | 0.01 | 0.01 |
| Water | 13.5 | 13.5 | 13.5 | 13.5 | 12.8 | 12.8 | 12.8 | 12.8 |
| Compressive strength 1 d [MPa] | 38 | 42 | 35 | 39 | 38 | 38 | 38 | 37 |
| Compressive strength 28 d [MPa] | 59 | 68 | 66 | 71 | 61 | 64 | 66 | 71 |
| Flexural strength 1 d [MPa] | 4.5 | 5.7 | 5.5 | 5.6 | 4.5 | 5.6 | 4.9 | 4.0 |
| Flexural strength 28 d [MPa] | 7.2 | 9.6 | 8.1 | 9.5 | 8.6 | 10.3 | 9.2 | 10.1 |
| Capillary absorption [kg/m$^2$h$^{1/2}$] | 0.073 | 0.068 | 0.060 | n.m. | 0.046 | 0.032 | 0.023 | n.m. |

| Example | 1-9 | 1-10 | 1-11 | 1-12 |
|---|---|---|---|---|
| OPC 2 | 35 | 33 | 31.5 | 29.75 |
| Sand | 65 | 65 | 65 | 65 |
| MK 2 | | 2 | 3.5 | 5.25 |
| Plasticizer | | 0.1 | 0.2 | 0.35 |
| Defoamer | 0.01 | 0.01 | 0.01 | 0.01 |
| Water | 12.8 | 12.8 | 12.8 | 12.8 |
| Compressive strength 1 d [MPa] | 38 | 43 | 41 | 40 |
| Compressive strength 28 d [MPa] | 61 | 67 | 69 | 67 |
| Flexural strength 7 d [MPa] | 6.8 | 7.9 | 7.0 | 6.7 | n.m.: not measured

It can be seen from the above table 2, that the addition of metakaolin leads to a general increase of compressive strength, especially after 28 days of curing. Also, the flexural strength is increased after 1 d, 7 d or 28 d of curing.

It can also be seen from the above table 2 that the increase of dosage of metakaolin to 17.6 mass parts per 100 mass parts of cement does not lead to a significantly increased strength performance, and in some cases even to a decrease of strength performance, as compared to a dosage of metakaolin of 6 or 11 mass parts per 100 mass parts of cement (compare e.g. example 1-4 with examples 1-2 and 1-3).

The capillary absorption is reduced with increasing dosage of metakaolin.

There is thus an optimum of metakaolin dosage for the purpose of increasing the strength performance and optimizing the capillary absorption. All of which are important features for compositions to be used in the refurbishment of porous construction materials.

Example 2-1 to 2-5

Examples 2-1 to 2-5 were prepared in the same way as examples 1-1 to 1-12 above. The following table 3 shows an overview of the compositions.

Examples 2-4 and 2-5 are comparative examples and not according to the present invention. Examples 2-1 to 2-3 are according to the present invention.

The resulting mixtures were tested as indicated above. The following table 3 shows the results.

TABLE 3

| Composition of examples 2-1-2-5 and measured results (all dosages in g) | | | | | |
|---|---|---|---|---|---|
| Example | 2-1 | 2-2 | 2-3 | 2-4 | 2-5 |
| CEM I 42.5 R | 39 | 39 | 35 | 31 | 21 |
| Sand | 60 | 60 | 60 | 60 | 60 |
| MK 1 | 1 | | 5 | 9 | 19 |
| MK 3 | | 1 | | | |
| Defoamer | 0.01 | 0.01 | 0.01 | 0.01 | 0.01 |
| Water | 9.5 | 9.3 | 10.5 | 12.2 | 20.4 |
| Carbonation depth [mm] | 1.2 | 2.0 | 1.8 | 2.2 | 13.5 |

It can be seen from the above table 3 that the carbonation depth of a hardened composition C according to the present invention is 2 mm or below (examples 2-1 to 2-3). With an increasing content of metakaolin, the carbonation depth also increases, which is unwanted. At 29 mass parts of metakaolin per 100 mass parts of cement, the carbonation depth is higher than 2 mm (example 2-4), at 90 mass parts metakaolin per 100 mass parts of cement, the carbonation depth increases to an unacceptable high level of 13.5 mm (example 2-5).

Examples 3-1 to 3-4

Examples 3-1 to 3-4 were prepared in the same way as examples 1-1 to 1-12 above. The following table 4 shows an overview of the compositions. The amount of plasticizer was adjusted to generate wet mixes of the same workability.

Examples 3-1 to 3-4 are according to the present invention.

The resulting mixtures were tested as indicated above. The following table 4 shows the results.

TABLE 4

| Composition of examples 3-1-3-4 and measured results (all dosages in g) | | | | |
|---|---|---|---|---|
| Example | 3-1 | 3-2 | 3-3 | 3-4 |
| OPC 2 | 33 | 33 | 33 | 33 |
| Sand | 65.9 | 65.2 | 64.8 | 64.6 |
| MK 1 | 1 | 1.7 | 2 | 2.2 |
| Plasticizer | 0.05 | 0.1 | 0.15 | 0.18 |
| Defoamer | 0.01 | 0.01 | 0.01 | 0.01 |
| Water | 13.5 | 13.5 | 13.5 | 13.5 |
| Compressive strength 1 d [MPa] | 36.4 | 37.5 | 36.9 | 35.5 |
| Flexural strength 1 d [MPa] | 6.1 | 7.1 | 6.1 | 6.4 |
| Capillary absorption [mm] | 0.062 | 0.05 | 0.045 | 0.046 |

It can be seen from the above table 4 that the compressive strength and flexural strength of a hardened composition C of the present invention is highest where 5 mass parts of metakaolin are used per 100 mass parts of cement (example 3-2). The capillary absorption is lowest where 6 mass parts of metakaolin are used per 100 mass parts of cement (example 3-3).

The invention claimed is:

1. A method for a refurbishment of porous construction materials, the method comprising:

mixing water and a composition C to form a mixture, the composition C comprising:
  a) 100 mass parts of Portland Cement,
  b) 1-6 mass parts of calcined clay, and
  c) optionally 10-250 mass parts of aggregates,
applying the mixture thus obtained to a porous construction material, and
optionally hardening the applied mixture,
  wherein the Portland cement is a high early-strength Portland Cement with a Blaine surface as measured according to EN 196-6:2010 of 2,500-10,000 cm2/g.

2. The method according to claim 1, wherein the calcined clay is metakaolin.

3. The method according to claim 1, wherein the method is selected from the group consisting of a method for protection against ingress according to method 1.3 of standard EN 1504-9, a method for a moisture control according to method 2.3 of standard EN 1504-9, a method for concrete restoration according to method 3.1 or 3.3 of standard EN 1504-9, a method for structural strengthening according to method 4.4 of standard EN 1504-9, a method for increasing a physical resistance according to methods 5.1 or 5.3 of standard EN 1504-9, a method of increasing a resistance to chemicals according to method 6.3 of standard EN 1504-9, a method of preserving or restoring passivity according to methods 7.1 or 7.2 of standard EN 1504-9, a method of increasing a resistivity according to method 8.3 of standard EN 1504-9.

4. The method according to claim 1, wherein the method additionally comprises one or more further steps selected from removing part of the porous construction material, cleaning a surface of the porous construction material, and/or priming the surface.

5. The method according to claim 1, wherein the method additionally comprises an application of further layers on top of the mixture of water and a composition C.

6. The method according to claim 1, wherein the mixture of water and composition C is applied in a one-step procedure as one layer or in a multiple-step procedure as two or three layers to yield a total layer thickness of 0.5-50 mm.

7. The method according to claim 1, wherein the mixture of water and a composition C is applied by trowel, brush or roller.

8. The method according to claim 1, wherein the mixture of water and a composition C is applied in a spray application.

9. A dry composition C for use in a method according to claim 1, the dry composition C comprising:
  a) 100 mass parts of Portland cement,
  b) 1-6 mass parts of calcined clay, and
  c) optionally 10-250 mass parts of aggregates,
  wherein the Portland cement is a high early-strength Portland Cement with a Blaine surface as measured according to EN 196-6:2010 of 2,500-10,000 cm2/g.

10. A wet composition obtained by mixing a dry composition C according to claim 1 with water in a water to powder ratio of 1:1 to 1:11.

11. A porous construction material obtained by a method according to claim 1.

12. A porous construction material according to claim 11, wherein it is part of basement walls, floor structures, drainages, pipes, silos, stairs, bathrooms, kitchens, swimming pools, balconies, terraces, ponds or basins, harbor structures or works of civil engineering.

* * * * *